US007399395B2

(12) United States Patent
Schnelle et al.

(10) Patent No.: US 7,399,395 B2
(45) Date of Patent: Jul. 15, 2008

(54) METHOD AND DEVICE FOR GENERATING MICROCONVECTIONS

(75) Inventors: Thomas Schnelle, Berlin (DE); Torsten Muller, Berlin (DE)

(73) Assignee: Evotec Technologies GmbH, Dusseldorf (DE)

( * ) Notice: Subject to any disclaimer, the term of this patent is extended or adjusted under 35 U.S.C. 154(b) by 910 days.

(21) Appl. No.: 10/416,054

(22) PCT Filed: Nov. 9, 2001

(86) PCT No.: PCT/EP01/12995

§ 371 (c)(1),
(2), (4) Date: Aug. 18, 2003

(87) PCT Pub. No.: WO02/38262

PCT Pub. Date: May 16, 2002

(65) Prior Publication Data

US 2004/0040848 A1 Mar. 4, 2004

(30) Foreign Application Priority Data

Nov. 10, 2000 (DE) ................................ 100 55 921

(51) Int. Cl.
*G01N 27/447* (2006.01)

(52) U.S. Cl. ...................................... 204/456; 204/643

(58) Field of Classification Search ................... 422/99, 422/100; 204/643, 547, 450
See application file for complete search history.

(56) References Cited

U.S. PATENT DOCUMENTS

| | | | |
|---|---|---|---|
| 3,907,521 A | 9/1975 | McConnell | |
| 5,788,819 A | 8/1998 | Onishi et al. | |
| 6,086,243 A | 7/2000 | Paul et al. | |
| 6,375,899 B1 * | 4/2002 | Ackley et al. | 422/68.1 |
| 6,663,757 B1 * | 12/2003 | Fuhr et al. | 204/450 |

FOREIGN PATENT DOCUMENTS

| | | |
|---|---|---|
| DE | 128 371 A | 11/1977 |
| DE | 198 59 461 A1 | 6/2000 |

OTHER PUBLICATIONS

Sanders et al., "Chip-based microsystems for genomic and proteomic analysis," *Trends in Analytical Chemistry*, vol. 19, No. 6, pp. 364-378 (2000).

Ehrfeld et al., "Microreactors for Chemical Synthesis and Biotechnology—Current Developments and Future Applications," *Topics in Current Chemistry*, vol. 194, pp. 233-252 (1998).

(Continued)

*Primary Examiner*—Kaj K Olsen
(74) *Attorney, Agent, or Firm*—Caesar, Rivise, Bernstein, Cohen & Pokotilow, Ltd.

(57) ABSTRACT

The invention relates to a method for generating a convective liquid motion in a fluidic microsystem. According to this method, a liquid in a microsystem is simultaneously exposed to an electrical field and a thermal gradient. The electrical field is generated by means of an electrode arrangement which is subjected to a time-variant voltage. In this way, a time variant electrical field is formed in the liquid volume. The thermal gradient is produced by means of at least one radiation absorber located in the compartment which is exposed to at least one external radiation field.

16 Claims, 2 Drawing Sheets

OTHER PUBLICATIONS

Fuhr et al., "Biological Application of Microstructures," *Topics in Current Chemistry*, vol. 194, pp. 83-116 (1998).

Shoji, "Fluids for Sensor Systems," *Topics in Current Chemistry*, vol. 194, pp. 163-169 (1998).

Fuhr et al., "Pumping of Water Solutions in Microfabricated Electrohydrodynamic Systems," *Micro Electro Mechanical Systems*, Workshop 5, pp. 25-30 (Feb. 4-7, 1992).

Melcher et al., "Traveling-Wave Bulk Electroconvection Induced Across a Temperature Gradient," vol. 10, No. 6, pp. 1178-1185 (Jun. 1967).

U.S. Appl. No. 09/868,199, Fuhr et al.

* cited by examiner (Stand der
Technik)

METHOD AND DEVICE FOR GENERATING MICROCONVECTIONS

This application is a 371 National Stage Entry of PCT/EP01/12995 filed on Nov. 9, 2001.

BACKGROUND OF THE INVENTION

The invention concerns a method for the generation of a convective liquid motion in a fluidic microsystem, especially a method for effecting mixing and turbulence in solutions or particulate suspensions in a fluidic microsystem, which is subjected to the simultaneous formation of electrical and thermal field gradients, and the invention further concerns a fluidic microsystem which is designed to enable the performance of the said method.

Fluidic microsystems find many applications in biochemistry, medicine and biology, especially for analysis of dissolved substances and manipulation of suspended particles. Due to the current miniaturizing and massive parallelization of the functioning processes in microsystems or microchips, special advantages arise for the analysis and synthesis of many biological macromolecules which exist in high combinatorial numbers (refer to G. H. W. Sanders et al., in *Trends in Analytical Chemistry,* Vol 19/6, 2000, page 364 ff; W. Ehrfeld in *Topics in Current Chemistry,* publisher, A. Manz et al., Vol. 194, Springer-Verlag, 1998, page 233 ff). Applications in the fluidic microsystems can be found in fundamental research, notably DNA analysis or protein analysis, or even in research of active substances in "combinatorial chemistry". Additional applications arise in the analysis and the manipulation of individual biological cells or cell groups (see G. Fuhr et al., in *Topics in Current Chemistry"* publisher, A. Manz et al., Vol. 194, Springer-Verlag, 1998, page 83 ff).

A general problem of fluidic microsystems arises due to the small dimensions of the compartments formed in the microchips, that is, the size of channels, reservoirs and the like, which are measured in the submillimeter range. As a consequence, hydrodynamic liquid flows possess small Reynolds numbers and in turn, liquids move through fluidic Microsystems in laminar flow. If in a microsystem any mixing of liquid does occur, then this is to be ascribed to diffusion of adjacent, laminar flows. In spite of the small dimensions of the microsystem, the diffusion of, for example, biological macromolecules, take place relatively slowly, and on this account, the throughput of the microsystem is severely limited.

An interest exists in achieving convective movement of liquids in a microsystem (such as acquiring turbulence of a liquid or intermixing of a plurality of liquids), which would be carried out with less sluggishness and takes place predominately independent of the characteristics of the liquid and which would assure optical qualities serviceable for observation.

Various approaches are presently known for the introduction of liquid turbulence or the thorough mixing of liquids in Microsystems. The usage of mechanical mixers, as such are employed in the macroworld, is very much limited in Microsystems due to the intense shear and friction. Because of the agglomeration of macromolecules, mechanically movable parts of a microsystem are very prone to failure. Further, as described by W. Ehrfeld, (see above) liquids do intermix by the separation of flows into partial channels, with a subsequent coalescing of the partial channels to bring about a changed spatial arrangement. This technology has the disadvantage, that in the partial channels, once again, the flow is laminar. A fully and thorough mixing is not achieved. S. Shoji describes in *Topics in Current Chemistry* 1988, (publisher A.

Manz et al., Vol. 194, Springer-Verlag, 1998, page 167 ff) an intermixing of liquids by inertial force, for example, a flow in lengthy, very convoluted channels. This technology, however, has the drawback, that the microsystem is handicapped by a complex apparatus. Beyond this, an intermixing of the liquids in the zig-zag channels can be achieved only by means of very high flow velocities (Reynolds number 2-100).

The generation of a convective liquid movement is also known, which is based on the simultaneous buildup of electrical and thermal field gradients in fluidic Microsystems. FIG. 4 shows in a schematic illustration, a conventional system for convective liquid movement, as has been disclosed by WO 00/37165. A compartment 10' of a fluidic microsystem 100' has, for example, a throughflow of particulate suspension in the direction of arrow A. In the compartment 10', it is intended that a turbulence in the liquid will occur. To this end, on the bottom 11' is provided an electrode arrangement 20', which is designed for the establishment of electric field gradients transverse to the direction A of flow. At the same time as the generation of these electrical field gradients, the liquid in the compartment 10' is heated. This heating brings about a thermal gradient and results in a lamination of the of the liquid with differently arranged partial layers corresponding to the thermal gradient. These partial layers, however, also possess different dielectric characteristics. By the action of the electric field gradients, forces are brought to bear on the different partial layers, which effectively lead to a convective turbulence of the liquid. For the development of the thermal gradients, the proposal of WO 00/37165 is to focus a laser beam in the arrow direction B through a transparent cover surface 13'. The liquid heats itself locally, as the desired thermal gradient is formed. The focus point 40' is located in the liquid with a separating distance allowed from the bottom and the side surfaces, in accord with the double arrow.

Creating convective liquid movement as illustrated in FIG. 4 possesses several faults. This producing of localized heating of the liquid, presupposes a corresponding absorption of the radiation. For many solutions, especially solutions or suspensions of interest in biological applications, a severe limitation of employing a laser for the purposes of radiation exists. A further disadvantage is found in that it may be desired to manipulate or optically detect suspended particles with lasers (optical cases). In some instances, this can lead to mutual interference of the different radiations. Finally, the reproductivity of convection induced by field and radiation means is also limited, since the point of focus for the production of the local heating in the liquid can only be repositioned again with reduced precision.

Thus the purpose of the invention is, to make available an improved method for the generation of a convective motion in a liquid in a fluidic microsystem, wherein the disadvantages of the conventional technologies for achieving thorough mixing or turbulence in liquids are overcome. The method is to especially gain an expanded field of application, in that the convective liquid motion is to be achieved independently of the absorption properties or other characteristics of the liquid in a microsystem, and to be repeatable with a high degree of reproducibility. The purpose of the invention further encompasses an improved microsystem to make this method operable.

SUMMARY OF THE INVENTION

A method for the generation of a convective liquid movement in a fluidic microsystem is described, wherein a liquid in the microsystem is simultaneously subjected to an electrical field and to a thermal gradient, whereby for the production of the electrical field, a time-variant voltage is applied to an electrode arrangement, so that, in the liquid medium, a corresponding time-variant, electric field is formed and for the establishment of the thermal gradients at least one radiation absorber, which is located in the compartment, is radiated with at least one external radiation field.

The basic concept of the invention, is to further develop the conventional technology for convective liquid motion by the simultaneous application of electric and thermal gradients in such a manner, that at least one thermal gradient is produced in any compartment of interest in a microsystem, by means of simultaneous, time-variant electrical fields and by the radiation of affixed radiation absorbers, which are located in the said compartment. The locating of the radiation adsorber in the microsystem has the advantage, that with external radiation, local heating results and a defined thermal gradient is established, which is independent of the characteristics of the liquid with reproducible geometric characteristics and is produced without disturbance of concurrent optical measurements or manipulations in the said microsystem.

In accord with the invention, the local heating in the microsystem is created by transmitting the radiation to the radiation absorbers. The heating is generated by a radiation source, from which the energy is transmitted by direction and focusing, without physical contact, on the radiation absorber. There is no direct mechanical contact between the radiation absorber and the source of radiation. Much more, the radiation source and the radiation absorber are set at a distance from one another. The heating of the radiation absorber is accomplished, for example, by focusing at least one laser beam onto a radiation absorber or alternately by specific heating with high frequency radiation, such as microwaves.

In accord with a preferred embodiment of the invention, a method for convective liquid movement is designed to use infrared radiation absorbers. The radiation absorbers are advantageously disposed on the wall surfaces of the compartments or they may be on electrodes in the compartment. Particularly of advantage is the construction of at least one electrode or electrode parts to serve as a radiation absorber. For example, the electrodes may be in partial layers and/or patterned on the surface to serve as radiation absorbers. In this way, a direct heating of the electrodes is enabled. The thermal gradients are automatically to be found in the same zone of the liquid as are the electrical gradients.

The frequency of the time-variant electric fields is dependent upon the individual application. This frequency represents, preferentially, the average, inverse dielectric relaxation time of the liquid and shows a value, using an aqueous solution as an example, of about 1 kHz. For oil based liquids this value can be 1 Hz or less.

An object of the invention is also a microsystem with at least one compartment, which is conceived for the realization of the convective liquid motion in accord with the invention. The said compartment will exhibit at least one therein affixed radiation absorber. In accord with an advantageous embodiment example, a microsystem is constructed with at least one external radiation source, with which the said at least one, fixed radiation absorber is heated. This combination possesses the special advantage of having a compact and universally applicable design.

The microsystem in accord with the invention also has the advantage of a simple construction. At optional locations in the fluidic microsystem, compartments with radiation absorbers can be provided for the convective motion of liquids by appropriate positioning of the electrodes for the establishment of electrical fields and for affixing the radiation absorbers.

BRIEF DESCRIPTION OF SEVERAL VIEWS OF THE DRAWINGS

Further advantages and details of the invention become evident from the description accompanying the attached drawings. There is shown in.

DETAILED DESCRIPTION OF THE INVENTION

The basic concept of the invention is initially explained with reference to FIG. 1, in which the various advantageous achievements obtained from radiation absorbers are illustrated. The implementation of the invention is, however, not limited to these immediate, given achievements of the different variants. Much more, in practice, it is possible to provide in a microsystem one or more of the radiation absorbers as depicted in FIG. 1, or as called for by the application.

Figure 1:
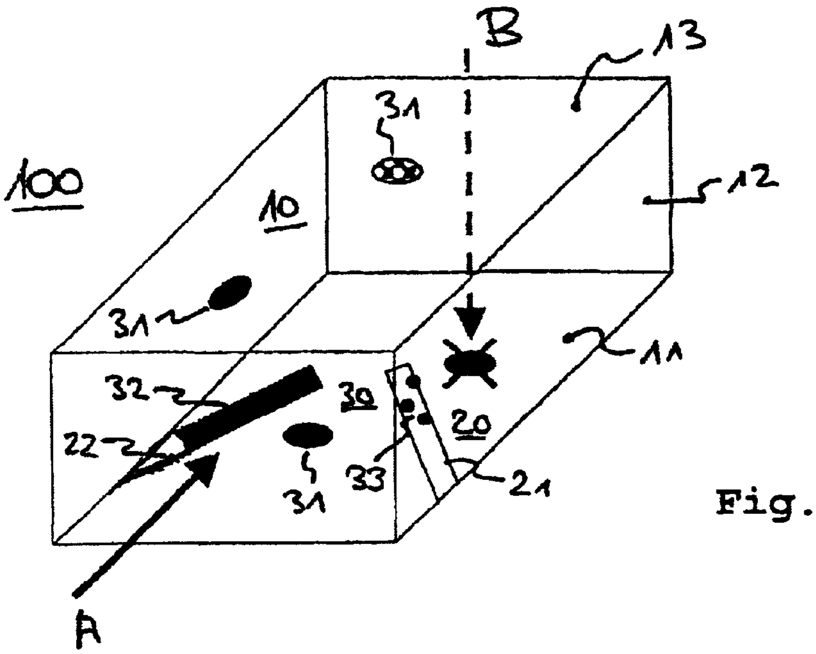
FIG. 1 a schematic perspective view of a compartment of a fluidic microsystem which is designed for the execution of the invented method, FIG. 2 a schematic top view of one embodiment of an invented microsystem, FIG. 3 a schematic top view of an additional embodiment of an invented microsystem, and FIG. 4 a schematic perspective view of a conventional microsystem, which is designed for a convective motion of liquid in accord with the former state of the technology.

FIG. 1 shows a compartment 10 of a fluidic microsystem 100. The compartment 10 provides a optional section of a microsystem 100, which is formed, as an example, by a channel, a reservoir, a confluence of flows, a diversion or another structure in the microsystem. The compartment 10 has, for example, a throughflow of a particulate suspension in the direction of the arrow A and includes in its structure at least a bottom 11 and side surfaces 12. On the upper side, the compartment 10 can remain open or it may be closed with a cover plate 13. The cross section dimensions of the compartment lie typically in the submillimeter range. Further details of the fluidic microsystem 100, especially its function, its fabrication, and its structure are commonly known and on this account will not be further explained in detail here.

In compartment 10, it is intended that the liquid, flowing in the direction of arrow A, or even if at a stillstand, be given a convective motion. To this end, there is to be found in compartment 10 an electrode arrangement 20 for the formation of a time-variant electrical field. The electrode arrangement 20 includes at least one free electrode, more preferably however, at least two electrodes 21, 22, which are placed on one or more of the walls of the compartment 10. In FIG. 1, as an example, 2 strip shaped electrodes 21, 22 are illustrated on the bottom 11. Electrical supply lines for connection with a source of voltage (said source not shown) are provided in the conventional manner.

Further, in compartment 10 is affixed at least one radiation absorber 30. A radiation absorber is an area which receives radiation, and is affixed within the compartment with a defined spatial border. This can be done by the introduction and the patterning of radiation absorbing materials in the compartment 10 and/or by the focusing of an external field of radiation in the arrow direction B onto fixed components in the said compartment 10, the components being, for instance, electrodes or walls, etc. This means, that radiation absorbers can be created from specific wall areas, or from non-conductive extensions of the electrodes. To serve as radiation absorbers, special absorber surfaces 31 are provided on the various walls of the compartment 10, namely the bottom 11, the sidewalls, 12 or the cover 13. The absorber surfaces 31 consist of an appropriately selected material, which has the greatest possible absorption for the given external radiation field.

The size of the radiation absorber for an application is dependent first, upon the dimension of the compartment 10, second, on the shape of the external radiation field and third, on the capability of said field to achieve a focus. Further the size of the radiation absorber is advantageously equal to half of the wave length of the chosen radiation. This size normally lies in the range of 0.5 to 25 μm.

Based on an advantageous and already realized variant, radiation absorbers are formed from at least one electrode in its entirety (see reference number 32) or from a radiation absorbing, surface patterning 33 applied onto at least one electrode (see electrode 21). If infrared light is employed as an external radiation field, then the electrodes 21, 22 consist, preferentially, of a "black body" material in the infrared spectral range, such as titanium, tantalum or platinum. It is also allowable that multilayer electrodes be employed, which consist of titanium/platinum or chromium/gold. Alternative to this, it is possible to install electrodes of a conductive, transparent material, such as ITO, a conductive polymer, upon which the absorbing areas can be completely covered or can be patterned, as may be seen illustrated in electrode 21.

A turbulence and intermixing is achieved in compartment 10 by mechanisms, as these, in part, are known from conventional convective movement. By the establishment of electrical fields in inhomogeneous media, voltages are induced, and liquid movement occurs through the action of these voltages. Because of the small geometric dimensions in the microsystems, field strength gradients in the kV to MV range are created, which in turn produce turbulences on a microscale. For the inhomogenizing of the medium, i.e., the liquid in the compartment 10, this is carried out by the creation of localized thermal gradient effects. Upon directed localized heating, the radiation absorber increases in temperature. In the liquid, a temperature field forms with a gradient. Advantageously, the direct heating of the electrodes 21, 22 can be done with infrared radiation, i.e., with an infrared laser. The special advantage of this embodiment is found in that the areas of the greatest field strength are definitely heated, and therewith become dielectrically inhomogeneous, which leads to a particularly effective turbulence. The radiation absorbers located in accord with the invention additionally make it possible, that the turbulences can be locally limited and the sluggishness of the system, because of the small expected volumes is especially small, this being some <0.1 s.

A further advantage arises in fluidic microsystems which emphasize dielectrophoretic manipulation of suspended particles. In cases in this area, the electrode arrangement 20 can be used simultaneously for the establishment of the time-variant electrical field and for the dielectrophoretic manipulation of the particles (for instance, biological cells—see FIG. 3).

The coupling of the radiation field is done externally through at least one transparent wall of the compartment 10 or by a light conducting optical fiber. The coupling of the radiation field is accomplished advantageously in the direction (B), which deviates from the direction of flow (A) in the compartment. For the coupling through the wall, then the cover 13 or the bottom 11 must be of transparent material. This can be plastic glass, or the like.

The radiation of the compartment 10, in accord with the type of construction and absorption characteristics of the radiation absorber can be effected by a beam which is spreading or is focused. Single focusing or multi-focusing can be employed. If the radiation is carried out with a spreading beam, then more radiation absorbers can be heated. Corresponding to the geometric placement of the radiation absorber, there is created in the compartment 10 a defined pattern of turbulence. In the case of a focused radiation, then at least one focus point (see reference number 40) is directed at least one radiation absorber. The radiation is carried out perpendicular to the bottom, the top, or the side surfaces of the compartment.

In order to assure that radiation directed at a radiation absorber be kept independent of the condition of the microsystem and the characteristics of the liquid in the compartment 10, advantageously, the wall is made of transparent material, on which are affixed one or more radiation absorbers, such as electrodes. For instance, provision has been made for the placement of electrodes of an infrared absorbing material on a transparent bottom 11 or for the placement of multilayer electrodes with an under-side layer of infrared absorbing material.

If entire partial areas of the compartment walls, because of manufacturing conditions, are made of an infrared absorbing material, then, the affixing of separate radiation absorbers can be dispensed with. In this case, the invented method is then carried out, in that the external radiation field is focused on the wall of the compartment.

This focus point finds itself advantageously directly on the electrodes bordering on, or affixed to, the bottom 11 the cover 13.

The external radiation field can consist of a high frequency, electromagnetic radiation, which evokes inductive heating of the electrode arrangement 20. Heating can also be provided by a thermal radiation of the electrode arrangement 20 from inset heating elements in the wall or bottom 11 of the compartment 10.

Figure 2:
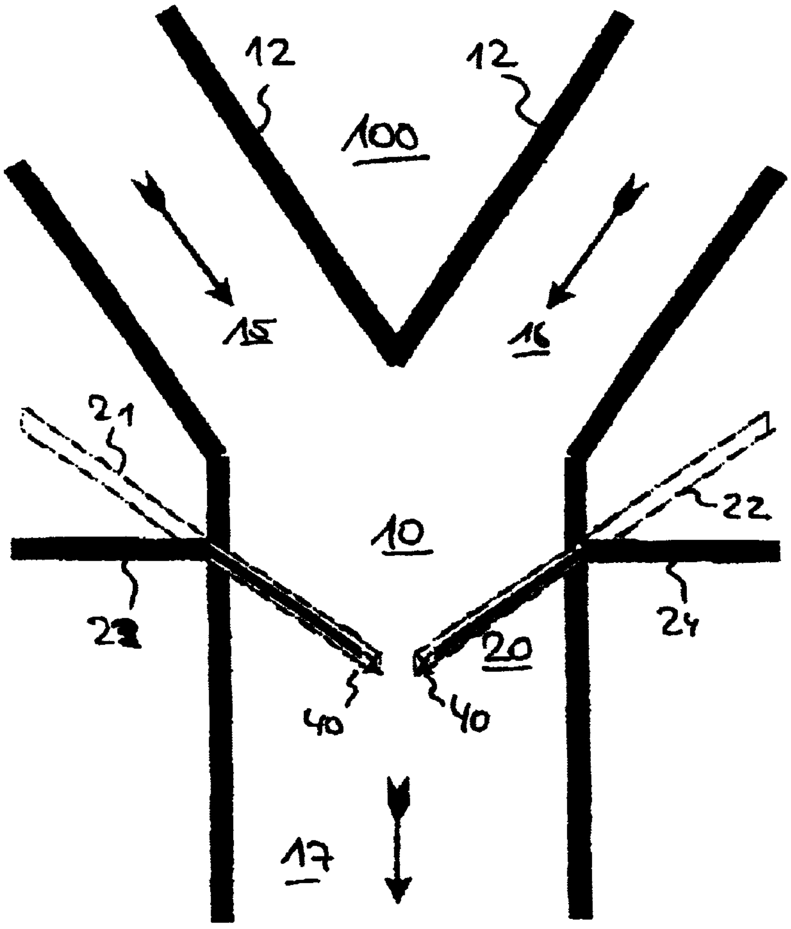

FIG. 2 shows an embodiment of an invented microsystem 100 in schematic top view. Two channels 15, 16, which are bordered by side walls 12, have, respectively, differing liquids flowing through them and these channels open into common channel 17. The compartment 10, in which an intermix of the unlike liquids is to take place, is provided at the common junction of the channels 15, 16. The compartment 10 could, if desired, be located downstream at a distance from the channel 17, which is also the junction of the channels 15, 16. The electrode arrangement 20 includes two electrodes 21, 22 shown in dotted lines which are on the bottom 11 of the compartment 10, and two electrodes 23, 24 shown in full lines, which are located on the top (not shown) of the compartment directly opposite to the bottom electrodes. The radiation of the compartment 10 is directed perpendicularly to the plane of the drawing, away from the view direction of the observer. The bottom 11 forms the side distal from the radiation. The cover side of the compartment is, conversely, proximal to the radiation.

The electrodes 21-24 are connected with an external alternating current source. Between the electrodes, an electrical alternating field is produced. By means of the external radiation, a heating of one or all of the electrodes takes place. For instance, provision can be made that only the upper, electrodes, proximal to the radiation are heated.

In accord with a preferred embodiment the provided electrodes on the bottom and cover surfaces are shaped differently, so that, by the projection in the direction of the radiation the shapes of the electrodes are not congruent. This enables, upon option, that only the lower electrodes on the compartment bottom, or only the upper electrodes on the compartment top are subjected to radiation. The asymmetry of the electrodes is illustrated in FIG. 2. The lower electrodes 21 22 possess a greater length, so that they extend themselves beyond the projection of the upper electrodes 23, 24.

Upon focusing the external radiation onto the ends of the lower electrodes 21, 22 (reference number 40), then only the lower electrodes are heated.

By means of the heating, an inhomogeneity takes place in the liquid flowing through the compartment 10. Due to the action of the electric, alternating field, there occurs in the liquid zone, which is stressed by the electrodes and the radiation absorber, a convective turnover of the liquids, so that these are mixed.

Figure 3:
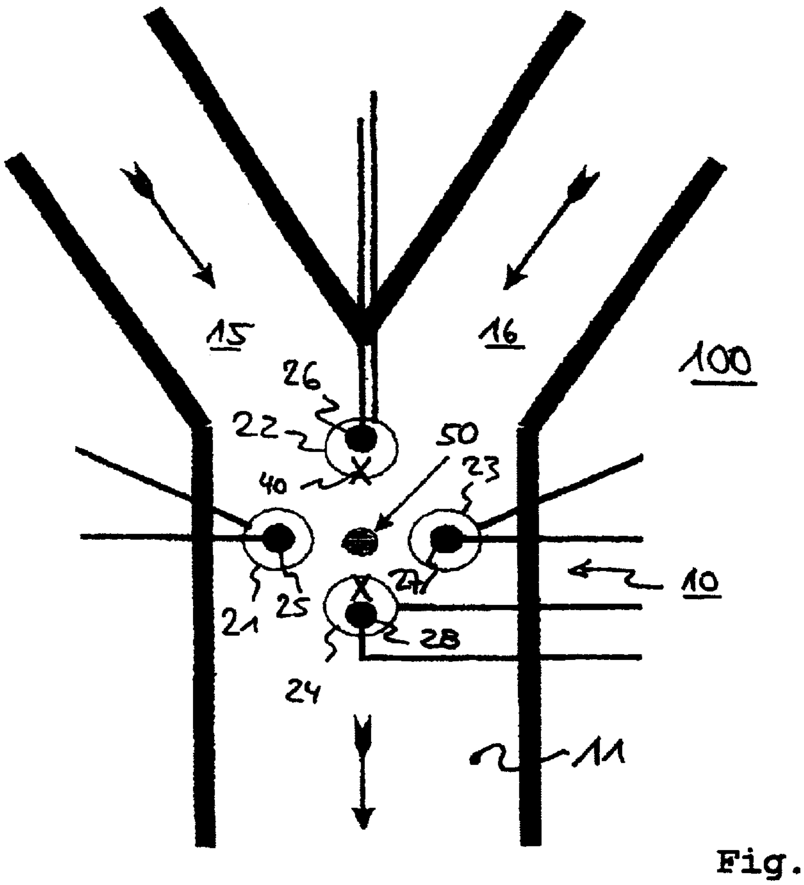
Figure 4:
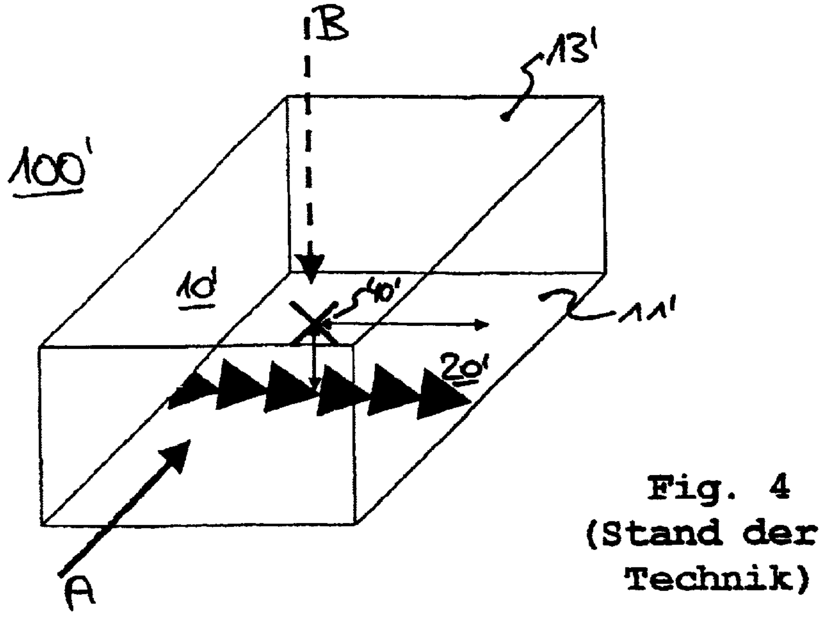

In FIG. 3, another embodiment of the invention is illustrated in schematic top view, wherein the microsystem 100 exhibits two converging channels 15, 16. In this embodiment, the electrode arrangement 20 is formed by an 8-pole assembly. Four electrodes 21-24 (shown with greater diameters) are to be found on the bottom of the compartment 10. The remaining four electrodes 25-28 are arranged on the top cover surface (not shown). The 8-pole electrode assembly generates, when a rotational voltage is applied thereto, a field cage, in which, in a known manner, a particle, such as a biological cell, can be maintained in a state of suspension.

The purpose of the arrangement illustrated in FIG. 3 is to be found, in that the particle 50 is to be treated simultaneously with the liquids flowing out of the converging channels 15, 16. The electrode arrangement 20, is simultaneously used first for the establishment of the dielectric field cage and second for the generation of the electrical alternating field to bring about the convective liquid movement. Since, analogous to the presentation in FIG. 2, the lower and the upper electrodes in the direction of the radiation are not congruent, the lower electrodes at the point 40 can be subjected to targeted external focusing and thereby heated. The inflowing liquids are made turbulent in the zone of the field cage.

Deviating from the presented embodiment example, an intermixing of the liquid can also be achieved with a planar electrode arrangement, which only includes voltage impressed electrodes 21-24 on the bottom surface, while on the side proximal to the radiation no electrodes, or free (floating) electrodes are provided. However, by this means, an intermixing is carried out with only small effectivity.

The disclosed features in the foregoing description in their various configurations, in the drawings, and in the claims can be of consequence in realizing the invention, not only individually, but also in optional combinations.

The invention claimed is:

1. A method for generating convective motion in a liquid in a fluidic microsystem, said method comprising:

providing the liquid in at least one compartment of the microsystem;

applying a time-variant voltage to an electrode arrangement to provide a corresponding time-variant electrical field in the liquid;

providing a thermal gradient in the liquid simultaneously with providing the electrical field in the liquid, wherein the thermal gradient is provided by at least one radiation absorber located in the at least one compartment being locally irradiated by at least one external radiation field formed by a single focus laser or a multifocus laser, wherein a wavelength of the laser is selected in a wavelength range in which the liquid and a suspended particulate in the liquid have no absorption, or possess only an absorption which is negligible in comparison to an absorption of the at least one radiation absorber.

2. The method of claim 1, wherein the at least one radiation absorber is formed by an absorber surface on a wall of the compartment, by an electrode of the electrode arrangement or by a radiation absorbing surface pattern on an electrode of the electrode arrangement.

3. The method of claim 1, wherein the laser emits infrared radiation, with which the at least one radiation absorber is inductively heated.

4. The method of claim 1, wherein the at least one external radiation field is coupled through a transparent wall of the compartment or is coupled by a light transmitting optical fiber.

5. The method of claim 1, wherein, for the establishment of the thermal gradient, a plurality of radiation absorbers in the compartment are irradiated simultaneously or alternately.

6. The method of claim 1, wherein the time related changing of the electrical field is produced by applying to the electrode arrangement an alternating current having a frequency of at least 1 kHz.

7. The method of claim 6, wherein the electrode arrangement is subjected to alternating voltage having a frequency corresponding to an average, inverse dielectric relaxation time of the liquid.

8. The method of claim 1, wherein a plurality of radiation absorbers are irradiated in a cascade manner in a channel of the microsystem.

9. The method of claim 1, wherein electrodes of the electrode arrangement are subjected to voltage to simultaneously generate the time-variant electrical fields and for pulsating fields for dielectric manipulation of particles suspended in the liquid.

10. A fluidic microsystem comprising:

at least one compartment for acceptance and/or throughput of a liquid, an electrode arrangement in the at least one compartment and designed for generating time-variant electric fields in the at least one compartment, at least one affixed radiation absorber in the at least one compartment, and forming a defined spatial delineation of at least one radiation absorbing zone, and a single focus laser or a multifocus laser adapted to irradiate the at least one radiation absorber, wherein a wavelength of the laser is in a wavelength range in which the liquid and a suspended particulate in the liquid have no absorption, or possess only an absorption which is negligible in comparison to an absorption of the at least one radiation absorber.

11. The microsystem of claim 10, wherein the at least one radiation absorber is formed by at least one absorber surface on a wall of the compartment, or by an electrode of the electrode arrangement or by a radiation absorbing surface pattern on at least one electrode.

12. The microsystem of claim 10, wherein the radiation absorbing area is respectively formed from an infrared absorbing material.

13. The micro system of claim 12, wherein the radiation absorbing material comprises at least one of titanium, platinum, tantalum and silicon.

14. The microsystem of claim 10, wherein at least one wall of the compartment is constructed of a transparent material.

15. The microsystem of claim 10, wherein at least one electrode comprises a transparent, electrical conducting material.

16. The microsystem of claim 10, wherein electrodes of the electrode arrangement in the at least one compartment are spatially displaced, so that direct radiation targeting the electrodes is made possible for an external source of radiation.

* * * * *